United States Patent [19]
Hayashi et al.

[11] Patent Number: 5,727,358
[45] Date of Patent: Mar. 17, 1998

[54] METHOD OF CONSTRUCTING A BUILDING

[76] Inventors: Yuuichirou Hayashi, 7-44 Hamada 1-chome, Sakata-shi, Yamagata 998; Keiji Satou, 75-4, Aza-Sawada Ooaza-Amarume; Manabu Watanabe, 19, Aza-Kazoeda Ooaza-Yoshikata, both of Amarume-machi, Higashitagawa-gun, Yamagata 999-77, all of Japan

[21] Appl. No.: 416,805
[22] PCT Filed: Aug. 23, 1994
[86] PCT No.: PCT/JP94/01388
   § 371 Date: Feb. 26, 1996
   § 102(e) Date: Feb. 26, 1996
[87] PCT Pub. No.: WO95/06172
   PCT Pub. Date: Mar. 2, 1995

[30] Foreign Application Priority Data

Aug. 25, 1993 [JP] Japan ................... 5/235483

[51] Int. Cl.⁶ .................. E04B 1/26; E04C 3/30
[52] U.S. Cl. .................. 52/745.2; 52/745.03; 52/656.9; 52/655.1; 52/665; 403/171; 403/231; 403/381
[58] Field of Search ................... 52/745.2, 743, 52/745.21, 745.03, 93.1, 90.1, 712, 702, 692, 696, 665, 668, 669, 655.1, 656.9, 641; 403/381, 231, 230, 171, 174

[56] References Cited

U.S. PATENT DOCUMENTS

| 2,895,186 | 7/1959 | Franks | 403/176 X |
|---|---|---|---|
| 3,991,535 | 11/1976 | Keller et al. | 52/690 X |
| 4,261,148 | 4/1981 | Scott | 403/403 X |
| 4,558,968 | 12/1985 | Meickl | 403/174 |
| 4,626,124 | 12/1986 | Laroche | 403/205 X |
| 5,022,209 | 6/1991 | Kimura | 52/665 X |
| 5,044,137 | 9/1991 | Shigeru et al. | 52/655.1 X |
| 5,284,311 | 2/1994 | Baer | 403/381 X |
| 5,323,584 | 6/1994 | Scarlett | 52/729 |
| 5,348,210 | 9/1994 | Linzell | 29/525 X |
| 5,412,913 | 5/1995 | Daniels et al. | 52/726.3 X |

FOREIGN PATENT DOCUMENTS

| 2647861 | 12/1990 | France . |
|---|---|---|
| 54156907 | 4/1953 | Japan . |
| 0387433 | 4/1991 | Japan . |
| 3176529 | 7/1991 | Japan . |
| 0431535 | 2/1992 | Japan . |

Primary Examiner—Carl D. Friedman
Assistant Examiner—Winnie S. Yip
Attorney, Agent, or Firm—Armstrong, Westerman, Hattori, McLeland & Naughton

[57] ABSTRACT

This invention relates to a new method for constructing of a building composed of combination of frame members, at an architectural spot, and aims to not only improve the efficiency in construction, but also to realize high insulation and airtightness in the building. Airtight lubricant is smeared on a frame member to be connected to a established frame member at its fitting end. The frame member is connected to the established frame member by dropping or heading, for example, reducing frictional resistance during fitting or connecting process due to the existence of the airtight lubricant. The process realizes high insulation and airtightness in the structure at the joint portion due to the existence of the airtight lubricant.

1 Claim, 3 Drawing Sheets

5,727,358

METHOD OF CONSTRUCTING A BUILDING

TECHNICAL FIELD

This invention relates to a new method of constructing a building composed of frame members, having fitting end structures for connecting pillars, wall panels, horizontal members (such as beams and girders), floor panels, or such, and which is built at the architectural spot by a combination of these members. This invention improves the efficiency in construction, the performance of insulation and the airtightness of the building. In particular, this invention is directed to an advantageous method of constructing of building such as a traditional Japanese wooden axal structure, which had been difficult to keep sufficient airtightness due to their perfect joint formation, or such as various kinds of panel methods which have become more popular because they may be built easily and rapidly.

BACKGROUND ART

The building of Japanese traditional wooden axal structures is on the verge of a crisis due to lack of skilled carpenters, having a steadfast popularity, the demand for them remaining high. Under such circumstances, the applicant of this invention realized a wooden axal structure which is similar to traditional wooden axal structure but different from the various kinds of previous prefabrication methods; a wooden axal structure able to greatly improve the efficiency in its creation including processing and construction, a joint structure thereof, and construction thereof, as disclosed, for example, in Japanese patent Application Nos. HEI3-119482, HEI4-223464, HEI4-22463 and HEI4-275032.

The inventions as disclosed in Japanese Patent Application Nos. HEI3-119482 et al are directed to a joint structure on top of a pillar especially in a wooden axal structure. However, these invention may differ somewhat from the traditional wooden construction style which is composed of a combination of pillars and horizontal members connected with said pillars with special methods, and further composed of other wooden pillars connected to said horizontal members.

The invention as disclosed in Japanese Patent Application No. HEI4-223463 is directed to joint structures which allow an upper wooden pillar to be vertically connected to a lower wooden pillar directly by using joint metals without exposing the metals at a corner of the wooden pillar, so that the metals do not hinder later when finishing the structure. The inventions as disclosed in Japanese Patent Application Nos. HEI3-86265 and HEI4-275032 et al. are adapted similarly to the above-mentioned technical idea of a base structure assembly.

In the above inventions, it is extremely important to allow precise measurements when building the wooden axal structure, including the joint portion structure among other structures.

Wood has more flexibility than other materials, but it is still highly necessary to obtain precise measurements of the wood. However, this results in the problem that a highly skilled technique and/or special machine are necessary for construction, especially to construct a joint assembly such as a fitting joint or a knocking joint. The present invention improves the efficiency in construction of the building while at the same time improves the airtightness of the building.

To deal effectively with such circumstances, this invention was developed and completed, contemplating a method of constructing a building (for example, the structure disclosed below). A basic technical idea of this invention may be efficiently and effectively adapted to a series of inventor's wooden axal structures. It is confirmed that this invention is also effective in constructing building of other structure styles.

DISCLOSURE OF THE INVENTION

As shown in the specific embodiment in the attached drawings, the general method of constructing a building is basically composed of following steps.

That is, this invention is directed to a method for constructing a building including frame members, which compose a main body of the building (such as pillars, wall panels, horizontal members including beams and girders, etc.) and has a fitting end structure for connecting at least one side, the building being built by the combination of the members, and comprising the steps of: smearing airtight lubricant to a frame member to be connected to an established frame member at its fitting end structure, next, connecting the frame member to the established frame member by the method of dropping or heading, for example, in order to reduce frictional resistance during the fitting or connecting process due to the existence of the airtight lubricant, so as to realize high insulation and airtightness of the structure at the joint portion.

The frame member may be a pillar, beam, girder, base, header joist, hiutizai (in Japanese name), cross bracing, for example, in the axal structure; and may be a wall panel, floor panel, for example, in the panel structure. The fitting edge structure of horizontal member 3 may be any of the conventional structures such as aikakikakou (in Japanese name), tenon formation, groove formation, yatoizanekakou (in Japanese name), and so on, at least one end; and the other end may connected by the vertically slide fitting method or contact fitting method to form the body of the building. The connection of these members had been done before ordinarily by force using "kakeya" (in Japanese name) at architectural spot.

The airtight lubricant may be a material which can continue to have a proper elasticity (its nature of hardening and shrinking) as long as possible. Also, rust should not occur when the airtight lubricant is attached to the metal. The airtight lubricant should have the proper viscosity to prevent dropping from the application surface during construction and from then on. The airtight material is economical. This airtight lubricant, inorganic tackiness agent or organic tackiness agent, can be used which meets the above-mentioned conditions, but most effective material found has been urea resin mixed with about 40% lime.

The airtight lubricant can be smeared on the joint end portion during the product process at the factory and covered with exfoliation paper, for example, but is desirable that it is smeared on each time by a brush at the construction site.

DETAILED DESCRIPTION

Figure 1:
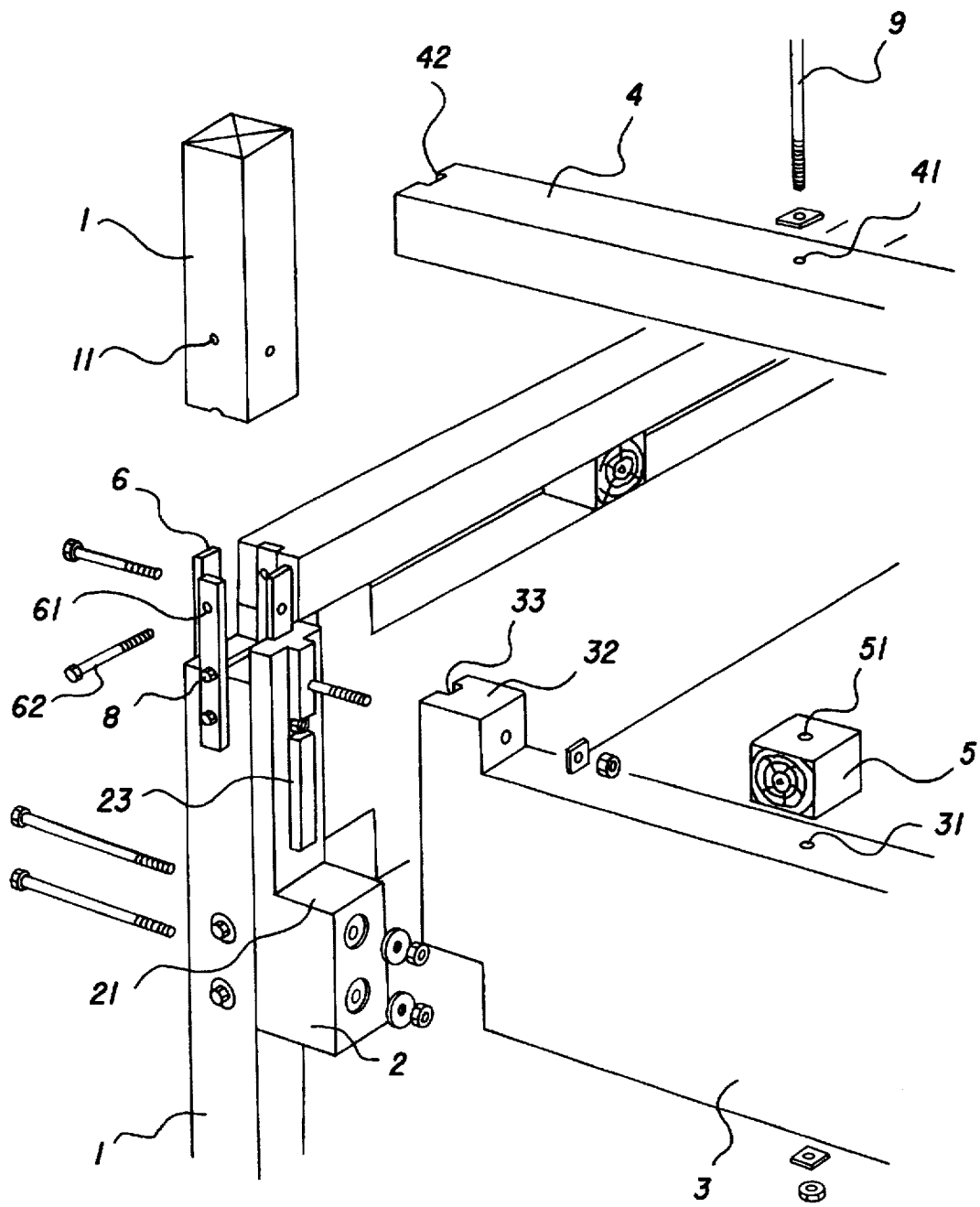
FIG. 1 is a perspective view showing around the top of a wooden pillar.
Figure 2:
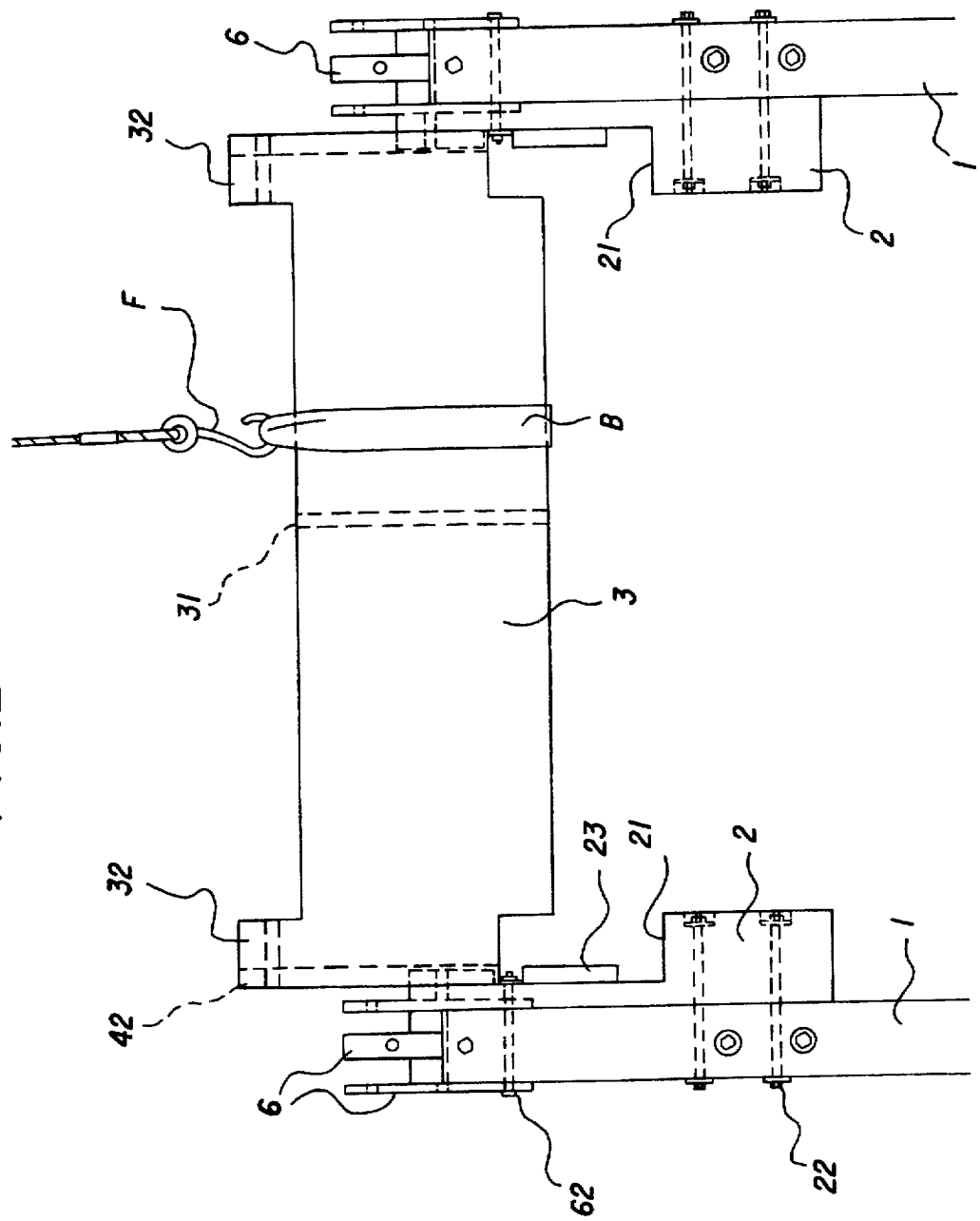
FIG. 2 is a plan view showing a step in assembling of the horizontal member, which is a part of the construction process of the joint structure.
Figure 3:
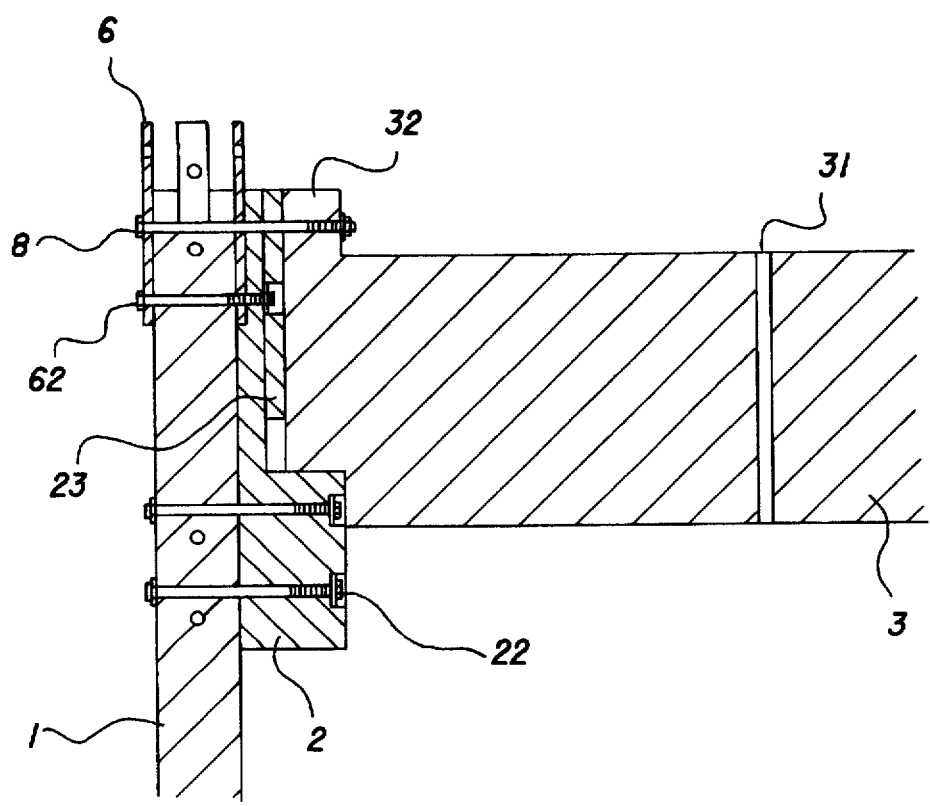
FIG. 3 is a vertical sectional view showing the joint structure including the horizontal member against the pillars.

FIG. 1 is a perspective view showing the connecting relationships around a joint portion of wooden pillars 1, 1.; FIG. 2 is a plan view showing one step in the constructing process of the joint structure; FIG. 3 is a partially enlarged vertical sectional view. As shown in FIG. 1–FIG. 3, the joint structure includes a wooden pillar 1 directly connected to the top of another wooden pillar 1 end to end. Horizontal members are composed of a pair of main-horizontal members 3, 3 and sub-horizontal members 4, 4 (that is, horizontal members composed of beams and/or girders) and are connected to said wooden pillar 1 at its top portion from two directions at right angles to each other. The upper surface of these horizontal members (specifically, the upper surfaces of the main-horizontal members 3, 3 and the sub-horizontal member 4, 4) respectively lie in the same plane.

First, as shown the perspective view in FIG. 1, rectangular metal pieces 6, 6 . . . are attached integral to the sides of the wooden pillar 1 at its top portion so that about half of their upper portion is exposed. The height of the main-horizontal members 3, 3 and the height of sub-horizontal members 4, 4, located parallel and above said main-horizontal members 3, 3, are maintained in part by pillar 1 in order to keep an operating space S.

The rectangular metal pieces 6, 6 . . . have holes 61, 61 . . . , which face each other in the vertical position and are vertically displaced at least by the distance of the diameter of the fixing member 62. (This structure can be realized by using two different rectangular metal pieces, but in this embodiment, holes 61, 61 . . . are located at the correct positions using the same rectangular metal pieces by turning them over up side down, and thereby simply shifting the position of the holes automatically.)

Next, joint parts 2, 2, are tightly connected to the top of the wooden pillar 1 at two sides adjacent to the outside of the rectangular metal pieces 6, 6 to extend below the height of the horizontal member. These rectangular metal pieces 6, 6, are at right angles to each other, and compose the contact surfaces to the pair of main-horizontal members 3, 3 and sub-horizontal members 4, 4. Top portions of the joint parts 2, 2 project above the top surface of the pillar and have a length equal to the height of each sub-horizontal member 4, 4, plus the length of the rectangular metal pieces 6, 6.

In this embodiment, the joint parts 2, 2 have recesses on their back side surfaces in order to contain the projections of the rectangular metal pieces 6, 6, which project from the surfaces of the pillar by their thickness. In the structure unified by the fixing members 22, 22, there are no spaces between the wooden pillar 1 and the rectangular metal pieces 6, 6 . . . .

The rectangular metal pieces 6, 6 and joint parts 2, 2 may be combined as an integral unit and fixed to one another. However, it is desirable to convey and to use several different kinds of factory produced wooden pillars 1, 1 . . . . having different designs in order to combine the joint parts 2, 2 . . . on top portion according to a beam construction drawing or a roof construction drawing.

The wooden pillars 1, 1 . . . at the architectural spot are established vertically on the base structure assembly, (which has been developed by the applicant of this invention and is disclosed in Japanese Patent Application No. HEI3-38265, for example), as the columns for the first floor, at first, by fixing at their leg positions. At that time, the airtight lubricant is smeared on the leg portions of the pillars 1, 1 . . . before they are inserted into the base structure assembly by dropping.

Then, the planned main-horizontal member 3 is connected between the joint parts 2, 2 by hoisting it with a crane etc. At that time, the airtight lubricant is smeared on both ends of the main-horizontal member 3, the same as with the above-mentioned leg portion of the pillar. Then the projection 23, 23 for positioning of the joint parts 2, 2 are inserted into the grooves 33, 33 formed at end sides of the main-horizontal member 3, and the main-horizontal member 3 is dropped until it reaches jaw 21.

The plan view in FIG. 2, omitting the middle portion of the main-horizontal member 3, shows this dropping process halfway completed. In the drawing, reference letter F shows a hosting hook, reference letter B shows a hoisting band.

The bump portions 32, 32 for connection are formed integral on the upper surface of the main-horizontal members 3, 3 at both of their end sides. After the horizontal placing of the main-horizontal member 3 on the jaw 21 of the joint part 2, it is connected by inserting the fixing member 8 through the wooden pillar 1, the bump portion 32 and the straight lined rectangular metal pieces 6, 6 to the main-horizontal member 3 from the exterior of rectangular metal piece 6 (that is, not covered by joint part 2), in order to prevent the horizontal movement of the main-horizontal member 3.

This embodiment shows that horizontal members are connected in a "L" shaped configuration against the wooden pillar 1 at the same level, and horizontal movement of the main-horizontal member 3 is prevented by arranging the fixing member 8 between the rectangular metal piece 6 and the wooden pillar 1, as above-mentioned. However, if desired, horizontal members may be connected to both sides of the wooden pillar 1, for example, you can realize it by arranging the fixing member 8 between the web portions 71, 71 of the "L" shaped members 7, 7 formed integral to the upper surface of the main-horizontal member 3, 3. Fixing member 8 runs through the rectangular metal pieces 6, 6 and the wooden pillar 1.

As mentioned above, once the main-horizontal members 3, 3 . . . are generally established around the wooden pillars 1, the tops of the wooden pillars 1 are generally formed in a single plane (that is, except for the construction like a middle second floor or split level floor, where the height of the floor is changed intentionally for some purpose.)

Also, the airtight lubricant may be smeared on a leg portion of the wooden pillar 1 for the roof structure or the upper floor structure, at the architectural spot. The wooden pillar 1 is vertically connected to the top of the fixed wooden pillar 1 of the first floor structure, (that is, the wooden pillar 1 for upper floor is connected to the top surface of the wooden pillar 1 for lower floor) by dropping the wooden pillar 1 for the upper floor among the rectangular metal pieces 6, 6 . . . , and integrating to the rectangular metal pieces 6, 6 . . . with the fixing members 62, 62.

Next, the spacers 5, 5 . . . are placed on the top of main-horizontal members 3, 3 . . . at a predetermined pitch so as to secure the operating space S at the upper surface of the main-horizontal member 3, and sub-horizontal member 4, 4 . . . are connected. At that time the airtight lubricant is smeared on both end portions of the sub-horizontal members 4, 4 . . . . In this way, all the horizontal members including the pair of the main-horizontal member 3 and the sub-horizontal member 4 are connected, up, down and around the wooden pillars 1, 1 . . . to keep the operating space S, and the joint structure vertically connecting two wooden pillars, is completed.

Then, end portions of the sub-horizontal member 4, 4 . . . are placed on top of the cut ends of joint parts 2. At the same time, exposed portions of rectangular metal pieces 6, 6 along with the cut ends of subhorizontal member 4 are completely covered with the airtight lubricant.

The assembly process of the invention is not limited to the above-mentioned specific process. For example, the order of assembling the main-horizontal member and the sub-horizontal member can be switched and a connecting member 9 can be connected at a later time by taking advantage of the operating space S. Furthermore, main-horizontal member 3, 3 . . . and the sub-horizontal members 4, 4 . . . may be connected around each of the pillars 1, 1 . . . through the joint parts 2, 2 . . . after the fixing of the all wooden pillars 1, 1 . . . for the upper floor by dropping them among the rectangular metal pieces 6, 6 . . . . But in all the assembly processes, the airtight lubricant should be smeared on the necessary portions.

In this embodiment, the wooden pillar 1 means a construction pillar (e.g., Japanese cypress, cedar or hemlock lumber either 105 mm or 121 mm square). The wooden pillar's height should be determined according to the dimensions of the horizontal member 3 which composes the architectural structure from the base or the sill, that is, the height of the skeleton framing of the roof beam and the roof plate etc. or the horizontal member 3 which composes the floor structure such as second floor and third floor, etc. that is, the height of the beam, girder, dosashi (in Japanese name), and so on.

Accordingly, in the construction of not only one-storied houses but also multi-storied houses, one is able to use wooden pillars having a standardized height thereby making the height of the skeleton framing of each floor standardized.

The rectangular metal piece 6 is used to connect the wooden pillar 1 vertically, and should be made of material having sufficient strength such as a steel plate, for example, and should be formed in a rectangular shape having the holes 61, 61 at the planned position so as to allow the inserting of the fixing member 62 (such as a bolt and nut pair, for example) to connect the wooden pillars to each other and to allow member 8 to connect the "L" shaped members 7, 7 each other.

The rectangular metal pieces 6, 6 . . . are fixed on the side surface of wooden pillar 1 by the fixing members 62, 62 . . . . projecting about half their length above the top surface of wooden pillar 1. Next, the wooden pillar 1 of the above floor is dropped from above and is connected to the wooden pillar 1 by the fixing members 62, 62 . . . , (such as a bolt and nut pair). That is the wooden pillars are connected end to end, by placing, the rectangular metal pieces 6, 6 . . . over the top portion of wooden pillar 1 and the bottom portion of wooden pillar 1 of the above floor.

The joint part 2 is attached to the side surface of the top portion of wooden pillar 1, facing the direction of the horizontal members to be connected, including the main-horizontal member 3 and the sub-horizontal member 4. The horizontal members may be connected by an adhesive, if necessary, and by fixing members 22, 22 . . . (such as a bolt and nut pair).

The joint part 2 supports the main-horizontal member 3 at its jaw 21 and the sub-horizontal member 4 at its cut surface. The joint part 2 covers the rectangular metal piece 6, (except for its top portion having a height of the sub-horizontal member 4), with the side which contacts the wooden pillar 1.

Automatic positioning may be utilized, if necessary, by forming suitable methods to position the center of the horizontal member 3 against a center of the wooden pillar 1 easily, for example, by forming a projected dowel or a simple adjusting formation, such as a convex shape or groove, into the wooden pillar 1 and form fitting this formation to the horizontal member 3 at the opposite position.

The horizontal member may include the combination of the main-horizontal member 3 and the sub-horizontal member 4, arranged above horizontal member 3 to leave an operating space spaced with spacer 5, and connected with fixing member 9. Both members 3, 4 are a substantially integral horizontal member. The horizontal member is connected to the wooden pillars 1, 1, indirectly, using as supporting part the jaw 21 and the cut surface of the joint part 2, attached integrally to the wooden pillar 1. The preferred embodiment contemplates the horizontal member to be connected horizontally to side surfaces of the wooden pillar 1, from only one direction; from two opposite directions; from two different directions (when the wooden pillar 1 is square, this connection results in an "L" shaped connection); from all directions except one (when the wooden pillar 1 is square, this connection results in a "T" shaped connection); from all directions (when the wooden pillar 1 square, this connection results in a "+" shaped connection).

The main-horizontal member 3 supports the horizontal force of the wooden structure, and bears floor weight. It may be connected to the wooden pillar by a tenon insertion, when the joint part 2 can support it at an end surface, for example, the jaw of the joint part 2, or by a perch connection, when the length of the joint part 2 is about half that of the height of the horizontal member 3. In order to prevent horizontal movement of the main-horizontal member 3, the fixing member 8 is arranged and fixed between the web 71 of the "L" shaped member 7 which is attached integrally to the upper surface of the main-horizontal member 3 within the operating space S, or between the "L" shaped member and the other "L" shaped member when the other horizontal member is connected to the opposite side, through the wooden pillar 1 and the rectangular metal piece 6.

The sub-horizontal member 4 is attached to the main-horizontal member 3 with the spacers 5, 5 . . . to maintain operating space S, and supports end portions of a common joist of the second or third floor, like a header joist, and becomes a connecting surface for a ready-made panel for the second and third floors. Furthermore the connecting side end portion of the sub-horizontal member 4 is placed on the upper end surface of the joint part 2, which was previously incorporated to the top of wooden pillar 1, and can cover the rectangular metal piece 6 projecting from the joint part 2 with its end surface.

A height of the spacer 5 is equal to the projected length of the joint part 2 from the upper surface of the main-horizontal member 3 (usually, about 10 mm), and a thickness of the spacer 5 is, at least on one side, greater than a thickness of the horizontal member 3 to have a sufficient section to for the fixing member 9 to go through. Especially, in the structure which uses a ready-made panel (not shown), somewhat larger members should be used as the spacers 5, 5 . . . to be able to support the panel at its side portion by a projected portion of spacers 5, 5 . . . (at least 2–3 mm of the spacer should extend past one surface of the horizontal member 3).

INDUSTRIAL APPLICABILITY

The method of constructing the building of this invention is extremely effective in raising the efficiency in construction and in the assembly of the frame members. This is especially true when constructing a building having frame members, which compose the body of the building, having a fitting structure for connecting at least one end portion, such as a pillar, a wall panel, a horizontal member (beam or girder, e.g.) a floor panel, and so on. For example, a building constructed by utilizing the technical ideas realized by the applicant of this invention (the joint structure on top of a pillar, disclosed in Japanese Patent Application Nos. HEI3-119482 and HEI4-223463, and the base structure assembly, disclosed in Japanese Patent Application Nos. HEI3-86265 and HEI4-275032), may be easily made having a structure similar to traditional wooden axal structures but also able to be made of ready-made precision members. The buildings constructed by "two by four method" or other various kinds of prefabrication method cannot make this claim. This invention solves the joint formation problems, allowing work space between members, and can achieve high insulation and airtight efficiency of a building.

That is, in the building which is composed of ready-made members to raise the efficiency in construction, it is difficult to use precision members because of the difficulty of constructing a fitting joint and a knocking joint in accordance with the necessary precise measurements. On the other hand, there is a demand to be able to construct a building by using more precise members so as to make the space between members and joints as little as possible, to thereby prevent air flow and heat or sound transmission from the joints or connecting points. Due to the above-mentioned circumstances, in the past, the ready-made members whose measurement do not hamper the assembly process are used, and tape is applied in order to deal with the space.

In contrast with this invention, the frame member to be connected has airtight lubricant smeared on before construction, and during construction is fitted and connected to another frame member by a dropping or a heading method, for example. Thus, it is possible to connect two members with little frictional resistance during the fitting and connecting process due to the airtight lubricant. Furthermore, in the completed building, the joint portion between the frame members realizes high insulation and airtightness in the structure due to the airtight lubricant. That is, not only possible to very easily construct the building using precision members, but also, the space between the members may be decreased, realizing high insulation and airtightness in the structure by placing the airtight lubricant in the space. Consequently, this invention has a significant benefit that the most effective structure of the building is realized along with a high efficiency in construction.

Especially, the above-mentioned embodiment can not only easily use ready-made members, but may be adapted to the structure of the wooden axal structure proposed by the applicant of this invention, also realizing high insulation and airtightness in the structure at joint portions from the start of construction, in addition to the high efficiency in the construction. And it can cheaply contribute to the high insulation and airtightness in the structure, which has been estimated to be in high demand in the future. Moreover by connecting the top of wooden pillar 1 of the first floor and the leg of the wooden pillar 1 of the upper floor, or roof structure, directly, the excellent axal structure is completed to convey the axal direction force smoothly below. When connecting wooden pillows of different floors end to end, the rectangular metal pieces 6, 6 . . . of the joint structure are completely covered, at least on the inside of the building, by arranging of the joint part 2, 2 . . . around the top of wooden pillar 1 and connecting the horizontal member (including the main-horizontal member 3 and the sub-horizontal member 4). Consequently, the popular wooden axal structure can be realized, which have many people have desired over finishing structures such as a stud wall structure, makabe (in Japanese name) structure or open structure without walls, for example.

Additionally, because the joint formation connecting the horizontal members does not substantially require impinging the surface of the wooden pillars 1, 1, (because, the wooden pillars 1, 1 are directly connected end to end, and horizontal members are connected to the wooden pillars through the joint parts 2, 2 . . . ), it is not necessary to consider the damage to the wooden pillar from the joint formation. Thus, it is possible to keep the top surface of all horizontal members in the same plane, generally, without regard to the connecting position of the horizontal member to the pillar in order to avoid section damage. In previous structures, it was extremely difficult to keep the top surface of all horizontal member in a same plane. In contrast, the use the ready-made wooden pillars 1,1, allows establishing the floor structure and roof structure by the ready-made members because of their well-ordered structure. Furthermore, not only the wooden axal structure type of building can be built easily and rapidly without relying on a special expert carpenter, but also the floor structure space of each floor and the roof structure may become compact, thus the height of building can be lower than previous buildings, and three-story buildings of the wooden axal structure can be built effectively.

Moreover, because the horizontal member is composed of a pair of the main-horizontal member 3 and the sub-horizontal member 4, and the main-horizontal member 3 supports the structure strength, on the other hand the joint formation for receiving the other member, such as a common joist, a header joist and a hiutihari (in Japanese name), for example, are formed on the sub-horizontal member 4, the section damage to the horizontal member is extremely easy to consider, so the building is safe, and extension and reconstruction work, done after construction, can be done safety.

As mentioned above, according to the method of constructing a building according to this invention, a building with high airtightness and insulation in the structure can be completely built efficiently by using the ready-made and precision members, minimizing the expense of construction and maintenance costs of the building. Moreover, by using the present invention along with the inventions realized by the applicant of this invention, such as the joint structure, for example, the efficiency in construction may be increased without effecting the traditional structure style, resulting in a building with sufficient structural strength. Therefore, this invention can resolve problems due to the lack of skilled carpenters while still providing people, who are not satisfied with the prefabricated building and who desire the traditional wooden axal building, with a high quality wooden axal building at a reasonable price. This invention is a new and effective method of constructing of a building.

We claim:

1. A method of constructing a building comprising:

connecting rectangular members on top of a pillar having a length related to a height of a horizontal member for a roof structure or an upper floor structure, and projecting about half length of the rectangular members from a top surface of the pillar;

creating a joint part, formed by a dropped support having a length greater than the height of a horizontal member, to the pillar from an exterior surface of a rectangular member to be connected to the horizontal member, the horizontal member including a main-horizontal member and a sub-horizontal member, the support projecting from top surface of the pillar by a distance of the projected portion of the rectangular member minus the height of the sub-horizontal member;

connecting a pillar smeared with an airtight lubricant at a leg portion, for a roof structure or an upper floor structure, to the pillar vertically, keeping airtightness by dropping among the rectangular members and fixing by a fixing member;

connecting the main-horizontal member and the sub-horizontal member, smeared with the airtight lubricant at their end surfaces and at a planned bellow surface, between the adjacent joint part by dropping;

fixing to each other using both, the main-horizontal member and the pillar, and the main-horizontal member and the sub-horizontal member by using a operating space between the main-horizontal member and the sub-horizontal member.

* * * * *